US009878418B2

(12) United States Patent
Dall'Aglio (10) Patent No.: US 9,878,418 B2
(45) Date of Patent: Jan. 30, 2018

(54) APPARATUS FOR CHECKING DIAMETRAL DIMENSIONS OF PINS

(71) Applicant: Marposs Societa' Per Azioni, Bentivoglio (bo) (IT)

(72) Inventor: Carlo Dall'Aglio, Castello D'Argile (IT)

(73) Assignee: Marposs Societa' Per Azioni, Bentivoglio (bo) (IT)

( * ) Notice: Subject to any disclaimer, the term of this patent is extended or adjusted under 35 U.S.C. 154(b) by 134 days.

(21) Appl. No.: 15/022,432

(22) PCT Filed: Sep. 16, 2014

(86) PCT No.: PCT/IB2014/001837
§ 371 (c)(1),
(2) Date: Mar. 16, 2016

(87) PCT Pub. No.: WO2015/036851
PCT Pub. Date: Mar. 19, 2015

(65) Prior Publication Data
US 2016/0221142 A1  Aug. 4, 2016

(30) Foreign Application Priority Data

Sep. 16, 2013 (IT) .............................. BO2013A0498
Nov. 19, 2013 (IT) .............................. BO2013A0629

(51) Int. Cl.
*G01B 5/08* (2006.01)
*B24B 5/42* (2006.01)
*B24B 49/04* (2006.01)

(52) U.S. Cl.
CPC .............. *B24B 5/42* (2013.01); *B24B 49/045* (2013.01); *G01B 5/08* (2013.01)

(58) Field of Classification Search
CPC ................................ G01B 5/08; B24B 49/045
(Continued)

(56) References Cited

U.S. PATENT DOCUMENTS 3,802,087 A * 4/1974 Raiteri .................. B24B 49/045
33/501.03
4,637,144 A * 1/1987 Schemel ................ B23Q 17/20
33/501.03
(Continued)

FOREIGN PATENT DOCUMENTS

CN    101169318 A    4/2008
CN    101941102 A    1/2011
(Continued)

*Primary Examiner* — G. Bradley Bennett
(74) *Attorney, Agent, or Firm* — Blank Rome LLP; Mark J. Thronson; Tara L. Marcus (57) ABSTRACT

An apparatus for checking the diameter of crankpins (15) of a crankshaft during the working on a grinding machine comprises a V-shaped reference device (10), a measuring device (6), and a support device (4) with a first coupling element (9) rotating with respect to a support element (5) connected to the grinding wheel slide (2), and a second coupling element (12) rotating with respect to the first one and carrying the V-shaped reference device. Guiding means with a constraining linkage (20) connected to the support device, guide the engagement of the reference device with a crankpin, during the orbital motion of the latter, binding a part of the movement along a trajectory substantially parallel to the profile of the grinding wheel (1), while not interfering with the movements of the support device in the checking condition. A control device to bring the apparatus to the checking condition comprises a thrust element (40) that cooperates with the support device.

18 Claims, 10 Drawing Sheets

(58) Field of Classification Search
USPC .............................................. 33/555.1, 555.3
See application file for complete search history.

(56) References Cited

U.S. PATENT DOCUMENTS

| | | | | |
|---|---|---|---|---|
| 5,761,821 A * | 6/1998 | Laycock | ................ | B23Q 17/20 33/501.05 |
| 6,067,721 A * | 5/2000 | Dall'Aglio | ................ | B24B 5/42 33/555.1 |
| 6,430,832 B1 * | 8/2002 | Dall'Aglio | ................ | B24B 5/42 33/555.1 |
| 6,952,884 B2 * | 10/2005 | Danielli | ................... | B24B 5/42 33/501.02 |
| 7,020,974 B2 * | 4/2006 | Danielli | ................... | B24B 5/42 33/550 |
| 7,464,482 B2 | 12/2008 | Dall'Aglio et al. | | |
| 7,690,127 B2 | 4/2010 | Dall'Aglio et al. | | |
| 2003/0009895 A1 * | 1/2003 | Dall'Aglio | ................ | B24B 5/42 33/555.3 |
| 2011/0232117 A1 * | 9/2011 | Arnold | ..................... | B24B 5/42 33/555.1 |
| 2011/0237159 A1 * | 9/2011 | Araki | ..................... | B23Q 17/20 451/5 |
| 2012/0043961 A1 * | 2/2012 | Volk | ......................... | B24B 5/42 324/207.25 |
| 2013/0255092 A1 * | 10/2013 | Trionfetti | .............. | B24B 49/045 33/555.1 |

FOREIGN PATENT DOCUMENTS

| | | |
|---|---|---|
| EP | 1 118 833 A2 | 7/2001 |
| EP | 2 422 927 A2 | 2/2012 |
| WO | WO 97/12724 | 4/1997 |
| WO | WO 01/66306 A1 | 9/2001 |
| WO | WO 02/070195 A1 | 9/2002 |
| WO | WO 03/106108 A1 | 12/2003 |

* cited by examiner

APPARATUS FOR CHECKING DIAMETRAL DIMENSIONS OF PINS

TECHNICAL FIELD

The invention relates to an apparatus for checking diametral dimensions of a pin, rotating about a geometrical axis, in the course of the machining in a numerical control grinding machine having a grinding-wheel slide carrying a grinding-wheel, with a reference device adapted to cooperate with the pin to be checked, a measuring device, movable with the reference device, a support device for supporting the reference device and the measuring device, the support device having a support element adapted to be fixed to the grinding-wheel slide, a first coupling element coupled to the support element so as to rotate about a first axis of rotation parallel to the geometrical axis, a second coupling element carrying the reference device and coupled to the first coupling element so as to rotate with respect to it about a second axis of rotation parallel to the geometrical axis, a guiding mechanism associated with the support device for guiding the arrangement of the reference device onto the pin, towards a checking condition of the apparatus, and a control device for controlling automatic displacements of the apparatus from a rest position to the checking condition, and vice versa.

PRIOR ART

Apparatuses having said features, for example for checking, in a crankshaft, the diametral dimensions of crankpins rotating with orbital motion about a geometrical axis in the course of the machining in a grinding machine, are shown in the international patent application published under No. WO-A-9712724, filed by the same applicant of the present application.

In particular, according to the embodiments shown and described in the cited international application, the apparatuses have Vee-shaped reference devices that rest on the crankpin to be checked and maintain the correct cooperation with the surface of the crankpin substantially due to the gravity, and guide means associated with said Vee-shaped reference devices, with elements having suitable surfaces intended to enter into engagement with the same crankpin during the advance from a withdrawn position to the operating position.

The solutions illustrated in the international patent application WO-A-9712724 guarantee, from a metrological point of view, excellent results with small inertial forces, and the performance of the apparatuses with the equivalent features, manufactured by the applicant of the present application, confirms the validity and reliability of said solutions.

Sometimes, however, the shortage of space available in the machine tool for the checking apparatus makes it difficult or impossible the usage of said apparatuses comprising the guide means, that is the guide means cannot feature surfaces with the required extent that can guarantee the correct cooperation with the crankpin to be checked.

The European patent application published under No. EP-A-1118833, filed by the same applicant of the present application, shows different or additional guide means, with a limiting device of the guiding mechanism that comprises a shaft which can slide inside a tubular element connected to one of the coupling elements and the ends thereof are—in a phase of closing movement of the Vee-shaped reference device towards the pin to be checked—engaged with rest elements of the other coupling element and the fixed part. In this phase a quadrilateral is formed, the geometry thereof varies during the closing movement due to the sliding friction between the ends of the shaft and the rest elements, that however permits a guiding action up to the touch between the Vee-shaped reference device and the workpiece to be checked, following which at least one of the ends of the shaft detaches from the corresponding rest element.

This solution too obtained and obtains excellent practical results. As the orbiting rotational speed of the machined crankpin increases, both the described solutions may, however, present problems due to "bounces" of the Vee-shaped reference device when it meets the rotating pin, and unperceived and non-desirable detachments between the same Vee-shaped reference device and the surface of the pin to be checked. These problems can have even serious consequences for the integrity of the apparatus and other components of the machine tool, especially when the Vee-shaped reference device moves away from the proper trajectory of a not negligible distance, so as to bypass the orbiting pin, suffering blows and breakages.

DISCLOSURE OF THE INVENTION

Object of the present invention is to realize an apparatus for checking diametral dimensions or shape of rotating pins in the course of the machining in a tool machine, for example for in-process checking crankpins with orbital motion in a grinding machine, that ensures the same performance of the apparatuses according to the cited patent applications in terms of accuracy and repeatability and enables improving reliability and avoiding malfunctioning with simple and inexpensive means.

A checking apparatus according to claim 1 solves this problem.

BRIEF DESCRIPTION OF THE DRAWINGS

The invention is now described in detail with reference to a preferred embodiment illustrated in the attached drawings, given by way of non-limiting examples, wherein.

BEST MODE FOR CARRYING OUT THE INVENTION

Figure 1:
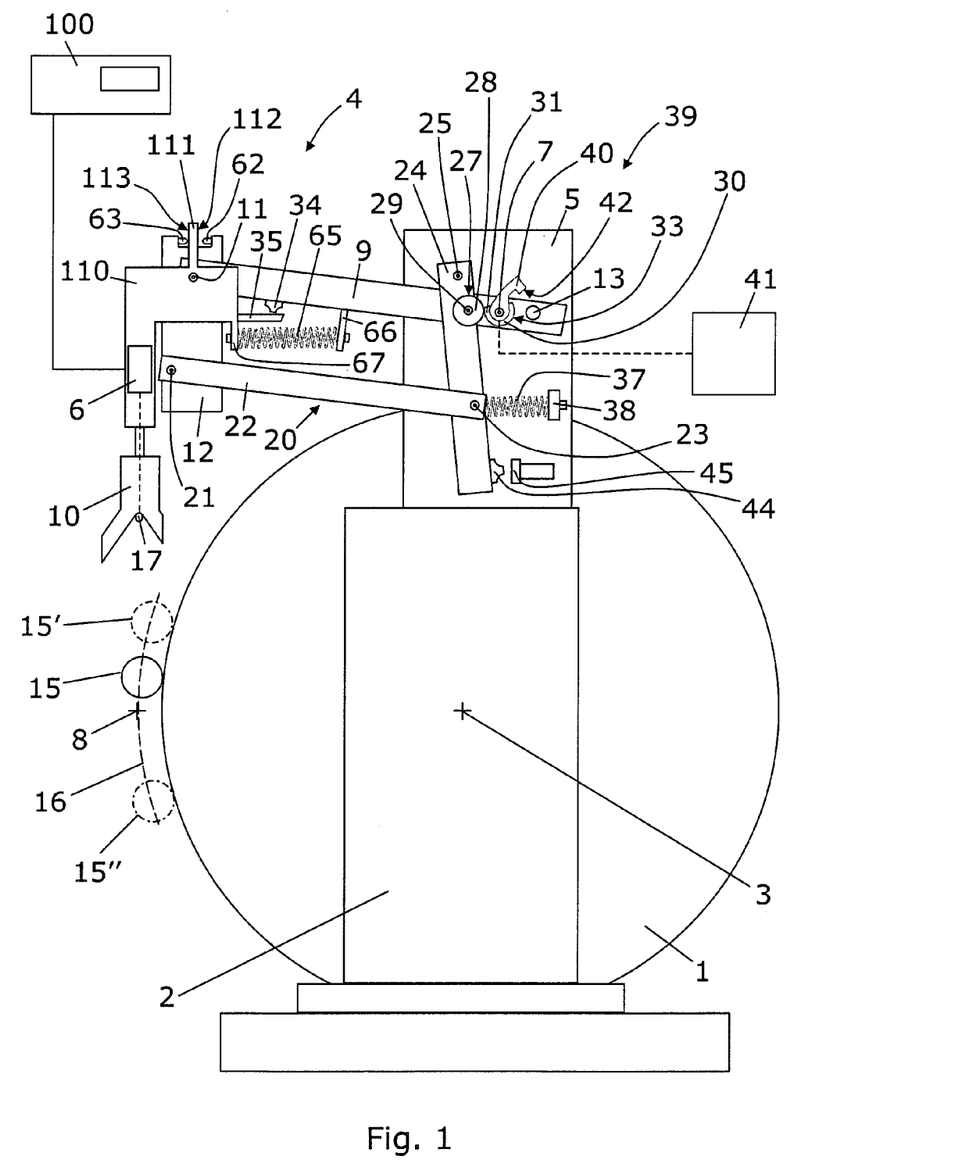
FIG. 1 is a very schematic lateral view that shows some components of a checking apparatus according to a first preferred embodiment of the present invention mounted on the grinding-wheel slide of a grinding machine for crankshafts.
Figure 2:
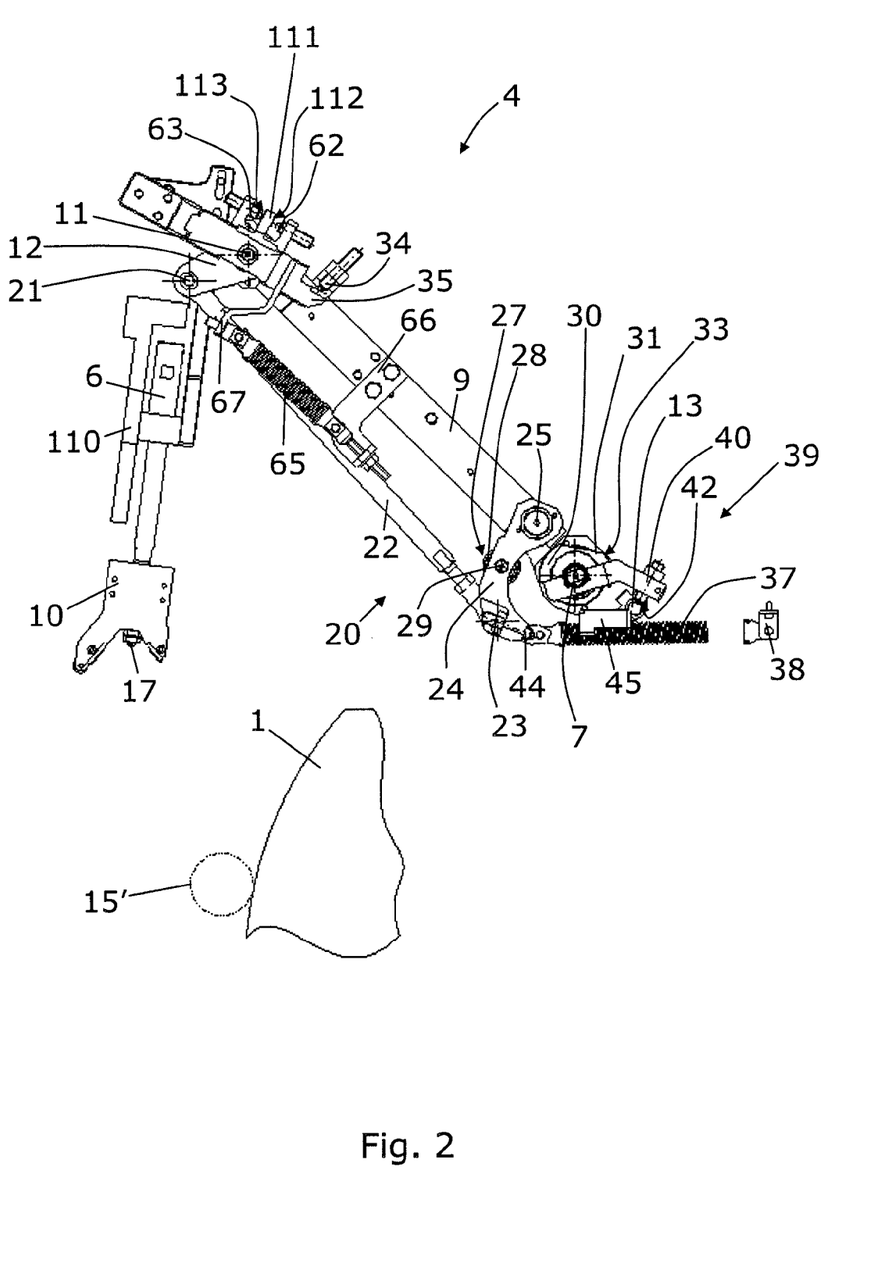
FIGS. 2 to 7 are lateral views, partial and with some details omitted, of an embodiment of the apparatus shown in FIG. 1, in different working conditions.

FIG. 1 refers to a first preferred embodiment of a checking apparatus according to the present invention and shows in a schematic way parts, known per se, of a computer numerical control ("CNC") grinding machine for grinding a crankshaft, in particular a grinding-wheel slide 2 carrying a grinding-wheel 1 adapted to rotate about a central axis 3 of rotation. A worktable comprises a spindle and a dead center, not shown in figure, that define a geometrical axis 8 of rotation, parallel to the central axis 3. A crankshaft to be machined is mounted on the machine tool with the main axis aligned with the geometrical axis 8. As a consequence, each crankpin of the crankshaft, only one crankpin being visible in the figures and indicated with the reference 15, runs through an orbital motion about the geometrical axis 8 and can take, among others, an upper position 15' and a lower position 15". Although the crankpin 15 eccentrically rotates about the geometrical axis 8, running a circular trajectory with respect to the geometrical axis 8, the trajectory of the crankpin 15 with respect to the grinding-wheel slide 2 can be represented, substantially, by the arc represented with the dotted line and indicated with the reference 16.

An apparatus according to the present invention comprises a supporting arm 110 that carries a reference device 10 adapted to cooperate with the pin 15 to be checked in the course of the machining, for example a V-shaped device with reference and rest surfaces intended to engage with the surface of the crankpin 15. Advantageously, the V-shaped device can have a side longer than the other and arranged in the farthest position with respect to the grinding wheel 1, as shown in the drawings, so as to perform an additional guiding effect and help the entry of the reference device 10 on the orbitally moving pin 15. A measuring device 6, known per se, for example alike that shown in the already cited patent application published under number EP-A-1118833, is connected to and movable with the reference device, detects radial displacements of a feeler 17 and is electrically connected to a processing and display unit 100 which is connected in turn (in a way known per se and not shown in figures) to the numerical control of the grinding machine. The feeler 17 is connected to the reference device 10 in order to touch the surface of the crankpin 15 to be checked and be able to move along a measurement direction that corresponds to the bisector of the V-shaped reference device 10, or is slightly angled with respect to it, and goes through the V-shaped reference device 10 between the relative reference and rest surfaces.

A support device 4, for supporting the V-shaped reference device 10 and the measuring device 6 in a movable way, comprises a support element 5 adapted to be fixed to the grinding-wheel slide 2. Through a first pivot that defines a first axis of rotation 7 parallel to the geometrical axis 8 of rotation of the crankshaft to be checked, a first coupling element 9 is coupled to the support element 5 in order to rotate about the first axis of rotation 7. Through a second pivot that defines a second axis of rotation 11 also parallel to the geometrical axis 8 of rotation, a second coupling element 12 is coupled in turn to the coupling element 9 in order to rotate, compared to the latter, about the second axis of rotation 11. Through the second pivot, the supporting arm 110 carrying the reference device 10 is in turn rotatably connected to the first coupling element 9 and to the second coupling element 12, in order to rotate, with respect to both the latter, about the second axis of rotation 11. Since the crankpin 15 to be checked in processing moves along the arc 16 with respect to the grinding-wheel slide 2, as said before, the reference device 10 runs a similar trajectory when it leans on the crankpin 15, with alternate motion from the top to the bottom and vice versa and with frequency—with several or many tens of revolutions per minute—equal to that of the orbital motion of the crankpin 15. This derives from the fact that the checking apparatus according to the present invention is carried by the grinding-wheel slide 2 that, in the modern grinding with numerical control, performs the machining of the crankpins 15 during their orbital motion "pursuing" the crankpins 15 so as to keep the grinding-wheel 1 touching the surface to be grinded. Obviously, a closing movement for the removal of the machining allowance adds to the "pursuit" transversal motion.

A guiding mechanism is associated to the support device 4 for guiding the arrangement of the V-shaped reference device 10 on the crankpin 15, that is towards a checking condition of the apparatus, and comprises a constraining linkage 20 between the grinding-wheel slide 2 and the second coupling element 12. In particular, the constraining linkage 20 comprises a third coupling element 22 coupled to the second coupling element 12 through a third pivot so as to rotate about a third axis of rotation 21 parallel to the geometrical axis 8 and spaced apart from the second axis of rotation 11, and a fourth coupling element 24 coupled to the support element 5 so as to rotate about a fourth axis of rotation 25 parallel to the geometrical axis 8 and spaced apart from the first axis of rotation 7. Said third coupling element 22 and fourth coupling element 24 are connected to each other in order to be able to mutually rotate about a fifth axis of rotation 23, also parallel to said geometrical axis 8. The guiding mechanism further comprises a stop surface 33, connected to the support element 5 and consequently integral with the grinding-wheel slide 2, and a bearing surface 27 connected to the fourth coupling element 24, adapted to enter into engagement with the stop surface 33. The stop surface 33 can be defined by means of an abutment element 30, for instance a cam, that is a substantially cylindrical element connected to the support element 5 in an axially rotatable way, with a lateral surface having variable radius that partly defines the stop surface 33 and shows a sector 31 with reduced radius whose function will be later illustrated. Likewise, the bearing surface 27 can be realized, for example, by means of a roller 28 connected to the fourth coupling element 24 adapted to idle about a sixth axis of rotation 29 parallel to the geometrical axis 8, and comprising a surface of rotation, for instance a cylindrical surface, defining the bearing surface 27. A traction spring 37, arranged between the fourth coupling element 24 and a fixed part of the grinding-wheel slide 2, for instance a part integral with the support element 5 and schematically represented in the figures with the reference 38, helps in keeping the engagement between the bearing surface 27 of the roller 28 and the stop surface 33 of the cam that realizes the abutment element 30 in a phase of the operation of the apparatus, as it is described hereinafter.

The arrangement and the dimensions of the different components is such that, when the bearing surface 27 touches the stop surface 33 (it is the configuration shown in FIG. 1), a position of the fifth axis of rotation 23 with respect to the first axis of rotation 7 and a mutual position of the first coupling element 9 and the third coupling element 22, substantially parallel to each other, are defined. In such a way, in the position taken at the touch between the bearing surface 27 and the stop surface 33, the first 7, the second 11, the third 21 and the fifth 23 axes of rotation locate the vertices of a parallelogram structure. Such structure comprises the first coupling element 9 and the third coupling element 22, opposed to each other and mutually parallel, in addition to a segment of the second coupling element 12 between the axes of rotation 11 and 21, and a "virtual" side, parallel to said segment, represented by the distance between the first axis of rotation 7 and the fifth axis of rotation 23 in the above-mentioned position. In this condition, called guiding condition, the stop surface 33 cooperates with the constraining linkage 20, the constraining linkage 20 and the support device 4 realize the parallelogram structure and the movements of the V-shaped reference device 10 are bounded to follow, under the effect of gravity, a circular trajectory imposed by the parallelogram structure, in particular a trajectory parallel to and at a reduced distance (typically few millimeters, even though in FIG. 1 such distance is shown larger for clarity reasons) from the profile of the grinding-wheel 1.

The checking apparatus according to the present invention further comprises a coupling and limiting mechanism 60 adapted to allow limited angular movements of the V-shaped reference device 10 with respect to the parallelogram structure about an oscillation axis parallel to the geometrical axis 8. Such coupling and limiting mechanism 60 can be realized by means of a central reference portion 111, integral with the supporting arm 110, and two stops 62, 63, integral with the second coupling element 12 and arranged facing each other, intended to touch mutually opposed surfaces 112, 113 of the central reference portion 111, with which the stops 62, 63 define pairs of mechanical abutments to limit the extent of the limited angular movements. An alternative embodiment implies that the stops 62, 63 are integral with the supporting arm 110 while the central reference portion 11 is integral with the second coupling element 12. A thrust device, for instance a spring 65, is arranged between a first hooking element 66 fixed to the first coupling element 9 and a second hooking element 67 fixed to the supporting arm 110.

A control device 39 for controlling automatic displacements of the apparatus from a rest position to the checking condition, and vice versa, comprises driving means, schematically shown in FIG. 1 with the reference 41, with an electrical motor that controls the rotation of a shaft aligned along the first axis of rotation 7, and a thrust element 40 connected, at the pivot that defines the first axis of rotation 7, to the support element 5 and to the driving means 41, the latter being adapted to cause clockwise and counterclockwise rotations of the thrust element 40 about the first axis of rotation 7. The thrust element 40 features a protruding portion that defines a thrust surface 42 intended to cooperate with, that is touch, a rung 13 that protrudes from a lateral wall and at a peripheral location of the first coupling element 9. In this first preferred embodiment of the invention, the cam that realizes the abutment element 30 is integral with the thrust element 40, and the stop surface 33, centered on the first axis of rotation 7, is adapted to rotate together with the thrust element 40.

Rest elements 34, 35 are integral with the first coupling element 9 and the supporting arm 110, respectively, and are intended to touch each other, kept also under the thrust of the spring 37, in order to delimit the closing angle between the two elements 9 and 12 in the movement carried out during the phase of return towards the rest position.

Two safe stops 44 and 45 are integral with the fourth coupling element 24 and the support element 5, respectively, and are intended to touch each other in order to delimit the closing angle between the parallelogram structure and the wheel 1, more specifically to avoid that the parallelogram structure closes on itself and, as a consequence, the reference device 10 impacts on the wheel 1 when, for some not predictable failure, the reference device 10 cannot succeed, in its closing movement, to intercept the orbitally moving crankpin 15.

Figure 3:
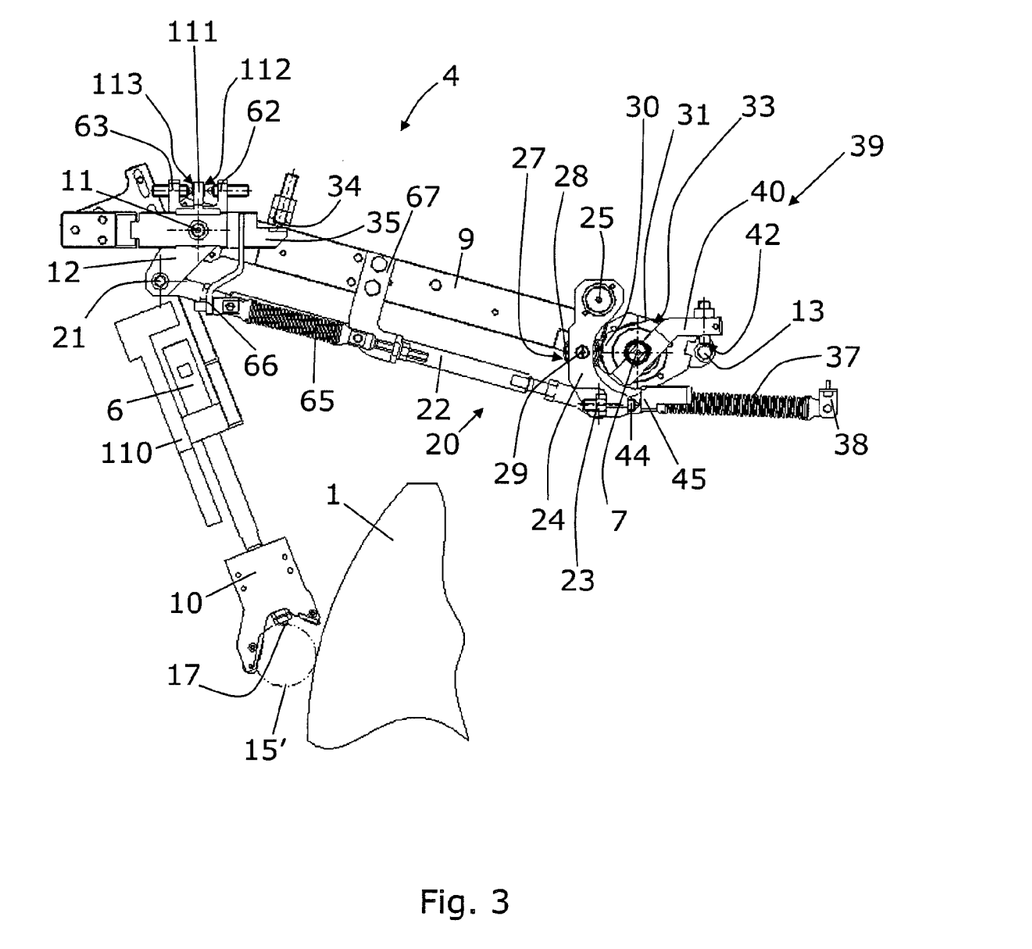
Figure 4:
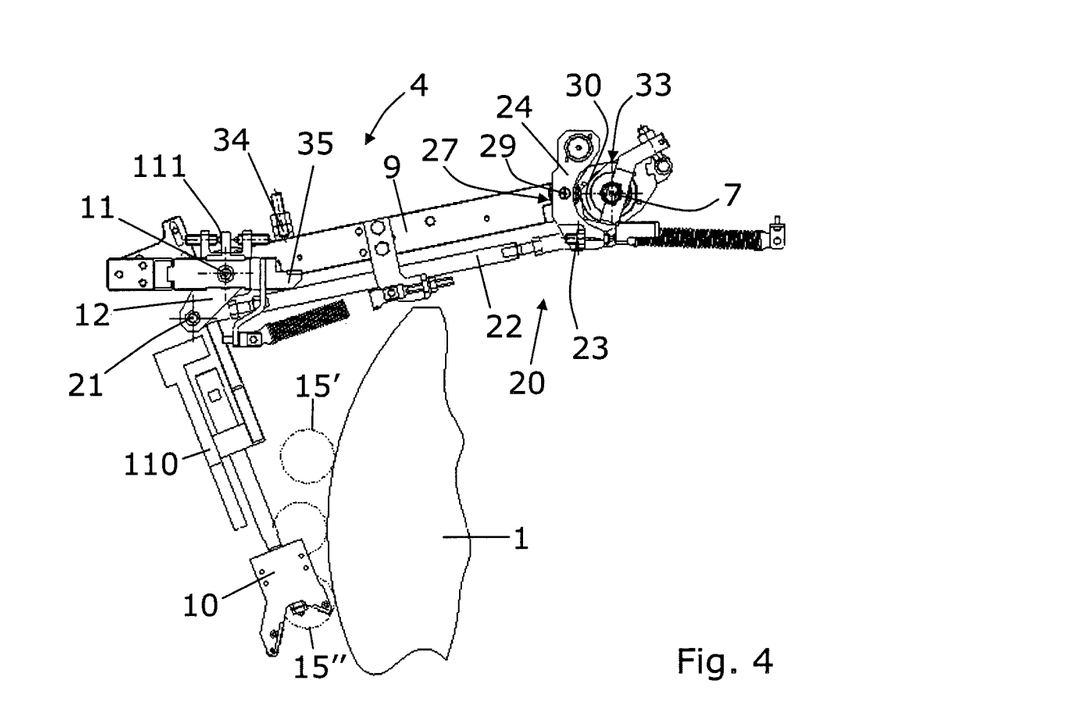
Figure 5:
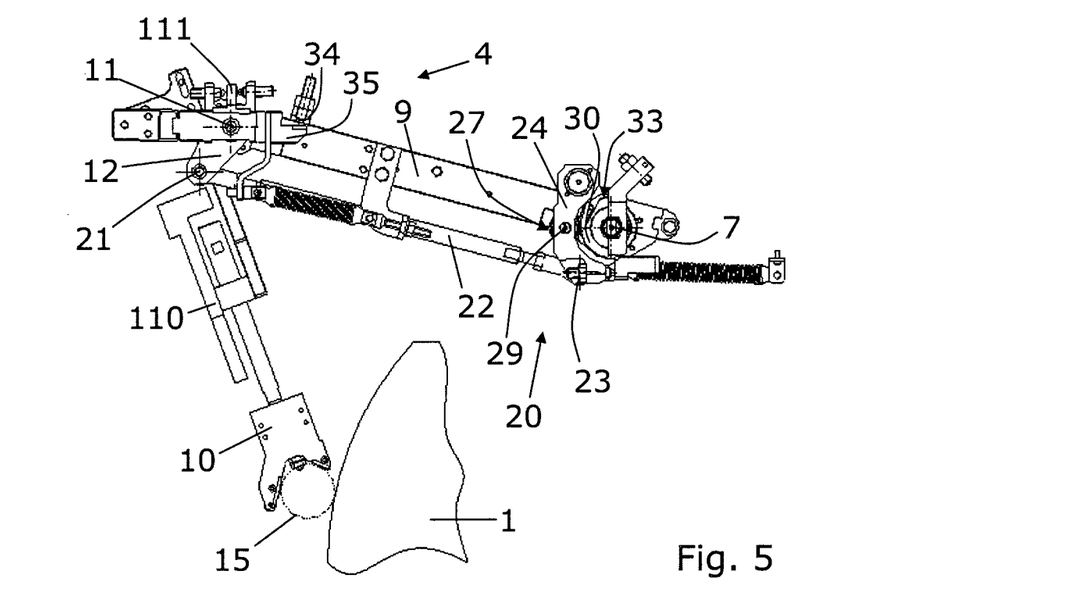

FIGS. 2, 3, 4 and 5 show a lateral view of an embodiment of the support device 4 in four different working moments. More specifically, FIG. 2 refers to the rest or non-operating position of the apparatus, wherein the V-shaped reference device 10 is lifted up. FIG. 5 shows the apparatus in the operative condition, more specifically in a moment of the machining of the crankpin 15 wherein the V-shaped reference device 10 is resting on the crankpin 15 and movements of the feeler 17 are detected by the measuring device 6 that provides signals related to the diametral dimensions of the crankpin 15 being machined to the processing and display unit 100. FIG. 3 shows an intermediate configuration of the guiding condition, during the advance between the rest position and the checking condition, wherein the stop surface 33 touches the bearing surface 27. In the situation shown in FIG. 4, the V-shaped reference device 10, owing to a not predictable failure, has missed the pin 15 during the approach and has gone beyond the lower position 15".

Figure 9:
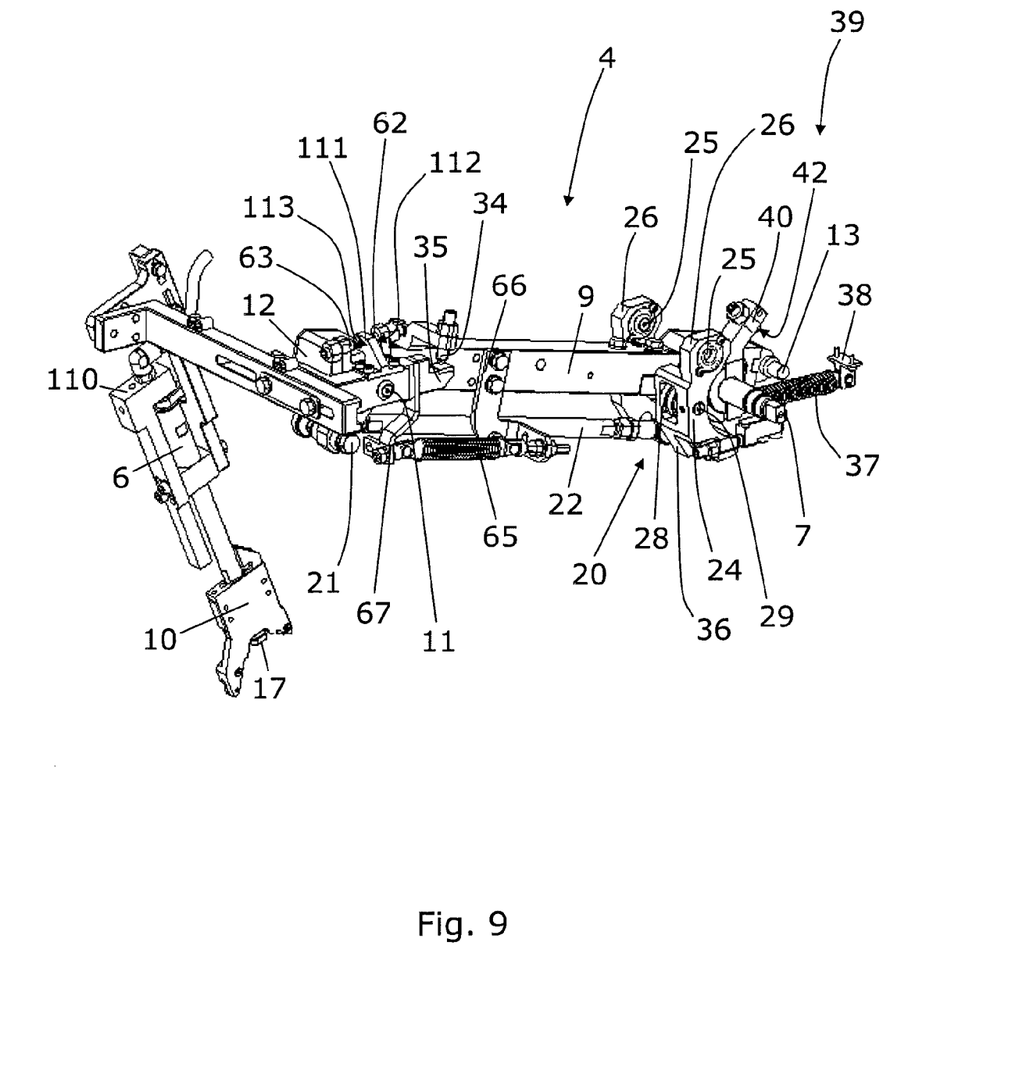
FIG. 9 is a perspective view of the apparatus of FIGS. 2 to 8.

As it is also visible in the perspective view of FIG. 9, that shows the checking apparatus of FIGS. 2 to 5 in an intermediate configuration, the fourth coupling element 24 is realized fork-shaped, pivoted both on the support element 5 at its free ends 26 (in a known way, not shown in figures) in order to define the fourth axis of rotation 25, and on the third coupling element 22 at a central area 36 that defines the fifth axis of rotation 23.

The behavior of the apparatus according to the invention in some working phases during the machining of a crankpin 15 is described in the following.

The retraction of the checking apparatus towards the rest position is usually controlled by the numerical control of the grinding machine when, on the basis of the measurement signal of the checking apparatus, it is detected that the crankpin 15 has reached the wanted (diametral) dimension. The retraction occurs by causing, through the driving means 41, a clockwise rotation (with reference to the figures) of the thrust element 40, so that the thrust surface 42 touches the rung 13 and, as a consequence, causes a clockwise rotation (always with reference to the figures) of the first coupling element 9 and the other components of the support device 4 in order to lift up the reference device 10 for example in the position shown in FIG. 2. During this movement, as a consequence of the mentioned rotations, the rest elements 34 and 35 touch with each other, limiting the closing angle between the first coupling element 9 and the second coupling element 12, with the aim of avoiding collisions between the V-shaped reference device 10 and parts of the machine tool. One can then proceed to the machining of other portions of the crankshaft, or—if the machining of the crankshaft is terminated—the workpiece is unloaded, manually or automatically.

When a new crankpin 15 has to be machined, it is brought in front of the grinding-wheel 1 and the apparatus moves in checking condition. This occurs, through the numerical control of the grinding machine and the driving means 41 of the control device 39, by causing a counter-clockwise rotation (with reference to the figures) of the thrust element 40 and so releasing the thrust applied by the thrust surface 42 on the rung 13. As a consequence, the first coupling element 9, the second coupling element 12 and the other components of the support device 4 rotate under the effect of gravity, that is the own weight of the components of the checking apparatus, and the V-shaped reference device 10 moves towards the crankpin 15, that in the meanwhile is movable according to its own orbital trajectory. In particular, in a first phase of the movement the rest elements 34, 35 touch with each other, while the stop 62 abuts against the surface 112 of the central reference portion 111.

After a rotation of some significance, and as the V-shaped reference device 10 moves towards the pin 15 in orbital motion and towards the grinding-wheel 1, the bearing surface 27 of the wheel 28 leans on the stop surface 33 of the abutment element 30 (FIG. 3) and the traction spring 37 contributes to maintain the touch between the bearing surface 27 and the stop surface 33. Starting from this point, the supporting arm 110 rotates with respect to the constraining linkage 20, the position of the central reference portion 111 changes and the thrust between the stop 63 and the surface 113 causes the rest elements 34 and 35 detaching from one another. Since, as described above, the position of the fork 24 and, as a consequence, of the fifth axis of rotation 23 are fixed, and being so defined a parallelogram with the vertices at the axes of rotation 7, 11, 21 and 23, the V-shaped reference device 10 is guided to move towards the crankpin 15 following a circular trajectory parallel to the profile of the grinding-wheel (FIG. 3), and at a predetermined distance to the grinding-wheel 1 (for example 2 or 3 millimeters), in a segment along which the V-shaped reference device 10 can touch the pin 15 at any time of the orbital movement of the latter.

Figure 6:
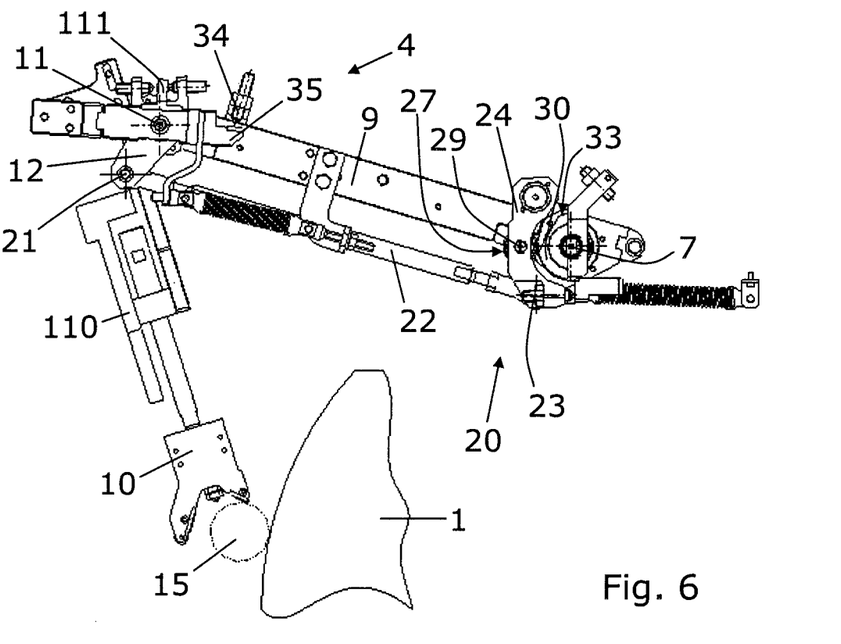
Figure 7:
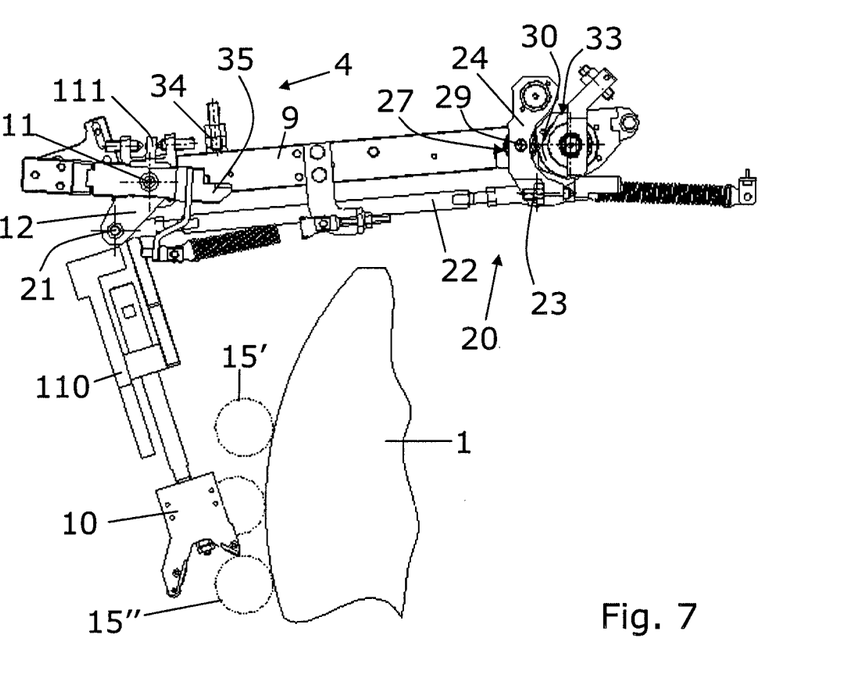
Figure 8:
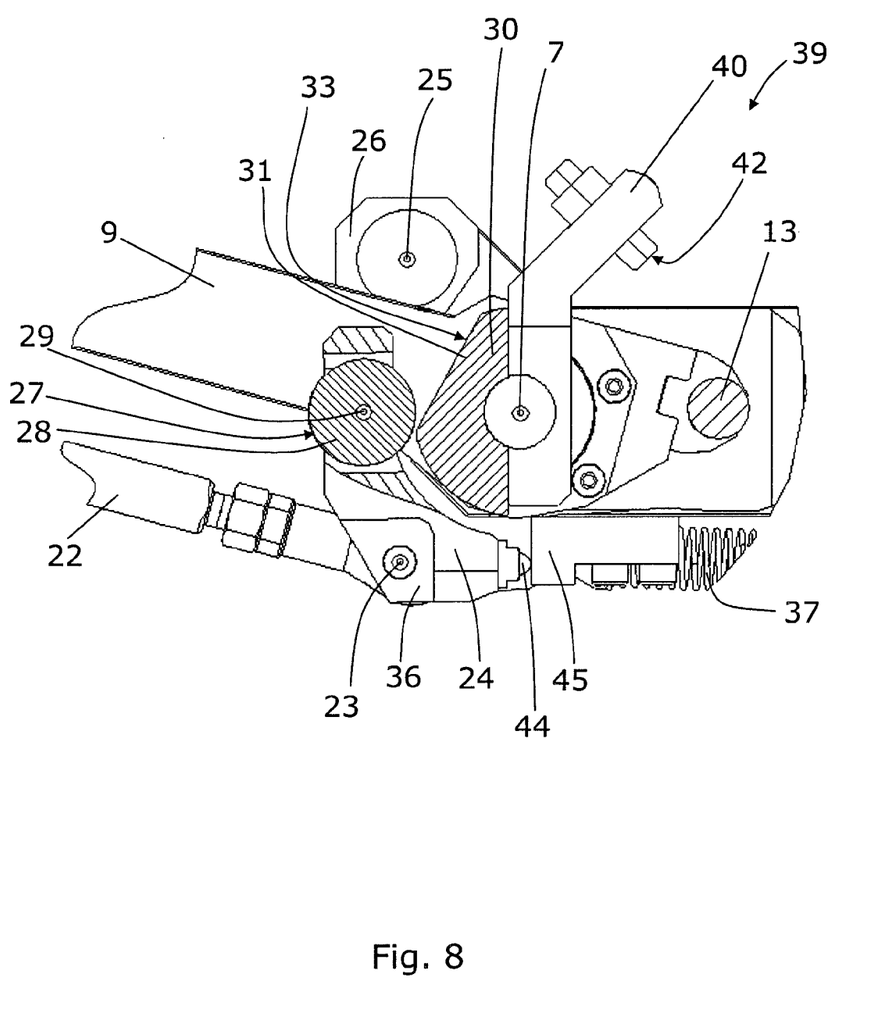
FIG. 8 is a partial and enlarged section of some components of the apparatus in the condition shown in FIG. 5.

After the V-shaped reference device 10 touches the crankpin 15, which orbitally moves at a rotational speed that can be even high (100 rpm, for instance), the pair of mechanical abutments limits unwanted movements of the V-shaped reference device 10 with respect to the wheel 1, movements that can occur as a consequence of possible bounces when the V-shaped reference device 10 hits the orbitally moving pin 15, and can cause breakages and risky situations for the known apparatuses, or even for different parts of the machine tool. In particular, such problems can take place if the V-shaped reference device 10, as a consequence of the impact with the pin 15, moves away from the grinding-wheel 1 so as to climb over the orbitally rotating pin 15. More specifically, the mechanical abutments defined by the central reference portion 111 and the two stops 62 and 63, limit the oscillations of the reference device 10 about the oscillation axis parallel to the geometrical axis 8. FIGS. 6 and 7 show two examples wherein unwanted and potentially dangerous movements of the V-shaped reference device 10, away from the grinding wheel 1, occur. Resulting rotations of the supporting arm 110 with respect to the parallelogram structure comprising the second coupling element 12, now clockwise (with reference to the figures), are limited by the touch between the stop 62 and the surface 112 of the central reference portion 111. The touch between the other stop 63 and the other surface 113 of the central reference portion 111 limits movements of the V-shaped reference device towards the grinding wheel 1.

The circular trajectory defined by the parallelogram in the guiding condition, as described above, has a limited size, sufficient to make sure that, in said segment, the reference device 10 can touch the pin 15. The trajectory segment is defined by an upper point corresponding to the first touch between the bearing surface 27 and the stop surface 33 of the abutment element 30, and a lower point defined by the shape of the cam that realizes the abutment element 30, and by its angular arrangement. In particular, the shape and arrangement of the abutment element 30 are such that, during the rotation integral to the thrust element 40, at the end of the trajectory segment cited above, when the reference device 10 has surely touched the pin 15 to be checked, the sector 31 with reduced radius finds itself facing the bearing surface 27. In the working condition, or checking condition of the apparatus, bearing surface 27 and stop surface 33 are so spaced apart and do not interfere with the free movement of the first coupling element 9 and the second coupling element 12. During the checking phase, indeed, the proper cooperation between pin 15 and reference device 10 is maintained mainly because of the movements of the first coupling element 9 and the second coupling element 12 due to the gravity and the thrust of the crankpin 15, in opposition to the gravity of the components of the checking apparatus.

It can be noted that, sometimes, a surface of the V-shaped reference device 10 can touch the pin 15 in orbital motion before the touch between bearing surface 27 and stop surface 33 occurs. More specifically, the full engagement of both sides of the V-shaped reference device 10 with the crankpin 15 can occur without the involvement of the guiding mechanism, and this can take place for pins 15 having relatively big dimension, for which the V-shaped reference device 10, during the checking condition, keeps a distance from the grinding wheel 1 always greater than the distance defined by the above-described parallelogram structure.

Typically but not only for pins 15 featuring relatively small dimensions, which is the most general and frequent instance, it may happen that, after the first touch with the V-shaped reference device 10, the following or already occurred cooperation between the bearing surface 27 and the stop surface 33 and the resulting movement of the V-shaped reference device 10 along the circular trajectory prevent the proper, full engagement of the V-shaped reference device 10 with the pin, that can take place only at the end of the rotation movement of the thrust element 40, when the sector 31 with reduced radius of the cam that realizes the abutment element 30 finds itself facing the bearing surface 27, and the movement of the V-shaped reference device 10 is no more constrained by the parallelogram structure.

Therefore, the existence of the guiding mechanism with the constraining linkage 20 allows to obtain a guided movement of the V-shaped reference device 10 towards the pin 15 to be checked, such a guided movement allowing the dynamic insertion of the former on the latter in a proper checking condition. The constraining linkage 20 performs the guiding function when, at a point of the automatic displacement controlled by the control device 39, the touch between bearing surface 27 and stop surface 33 occurs, and the closing movement of the reference device 10 towards the grinding wheel 1 is so limited, guiding the former to move along a trajectory substantially parallel to the profile of the grinding wheel 1. The guided movements along such trajectory take place until the proper cooperation between the V-shaped reference device 10 and the pin 15 occurs and, in the first preferred embodiment according to the figures from 1 to 9, until the stop surface 33 of the cam that realizes the abutment element 30 leaves the bearing surface 27, afterwards the guiding mechanism does not limit in any way the free movement of the first coupling element 9 and the second coupling element 12 during the checking phase, guaranteeing the proper cooperation, during this phase, between the V-shaped reference device 10 (and the feeler 17 connected to it) and the pin 15 in orbital motion to be checked.

In case that the V-shaped reference device 10, in its closing movement, for some not predictable failure, is not able to intercept the pin 15 and goes beyond the lower position 15" (FIG. 4), and the stop surface 33 leaves the bearing surface 27, as described above, the impact between the V-shaped reference device 10 and the grinding wheel 1 is prevented by the touch between the safe stops 44 and 45. It is to be noted that, in the other configurations shown in the drawings, the safe stops 44 and 45 are separated from each other, even though at a very small distance, not perceivable in the figures sometimes.

With respect to the solution that is known, for instance from European patent application published under No. EP-A-1118833, the structure of the apparatus according to the present invention, with the constraining linkage 20, allows to obtain movements of the reference device 10 that are guided with a higher accuracy, thanks to the possibility of defining an actual parallelogram and to the substantial lack of any sliding friction between the components.

Moreover, as already mentioned, the structure of the guiding mechanism according to the present invention allows to realize in a simple and reliable way a mechanism that limits unwanted movements of the reference device 10 away from the grinding wheel 1.

Figure 10:
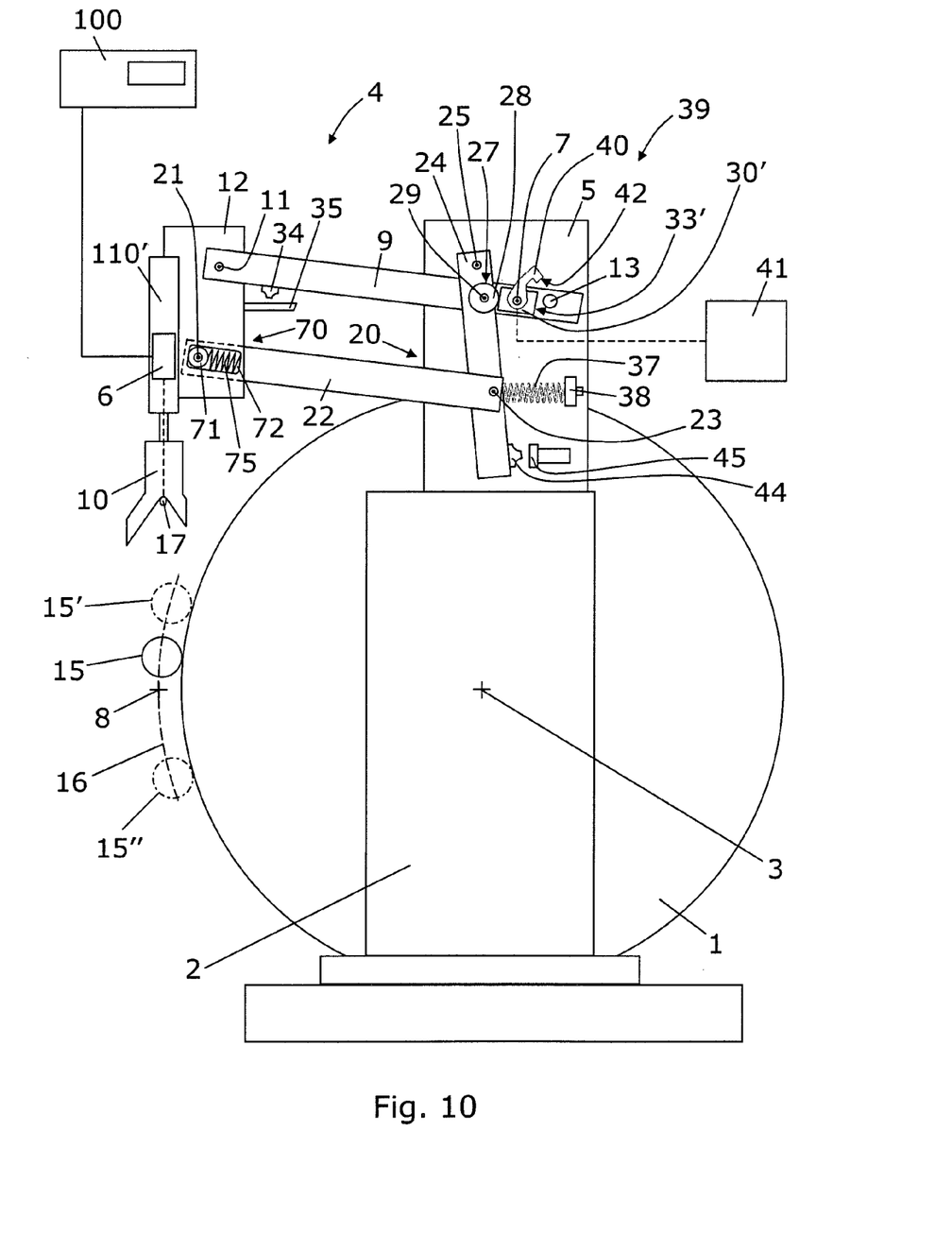
FIG. 10 is a very schematic lateral view that shows some components of a checking apparatus according to a second preferred embodiment of the present invention mounted on the grinding-wheel slide of a grinding machine for crankshafts.

FIG. 10 shows a second preferred embodiment of the present invention, with a supporting arm 110' integral with the second coupling element 12, and a different coupling and limiting mechanism 70 comprising a stud 71 fixed with respect to the third coupling element 22 of the constraining linkage 20, a slot 72 formed in the second coupling element 12, that houses the stud 71 and a thrust device or spring 75. The spring 75 thrusts surfaces of the stud 71 and of the slot 72, that define a pair of mechanical abutments, against each other.

The operation of the apparatus is substantially the same as described with reference to FIG. 1-9, as far as the guiding condition wherein the V-shaped reference device 10 is guided by the parallelogram structure towards the checking condition is concerned. Before the V-shaped reference device 10 touches the pin 15 to be checked, the position of the stud 71 in the slot 72 is steadily defined by the spring 75, and the third axis of rotation 21 is so defined. When the V-shaped reference device 10 touches the pin 15 to be checked, the thrust that the reference device 10 receives from the pin 15 overcomes that of the spring 75 and allows limited angular movements of the reference device 10 with respect to the parallelogram structure about the oscillation axis that, in this case, is coincident with the second axis of rotation 11. As in the instance of the FIGS. 1-9, during the checking phase the proper cooperation between pin 15 and reference device 10 is kept mainly because of the movements of the coupling elements 9 and 12 due to the gravity and the thrust of the crankpin 15, in opposition to the gravity of the components of the checking apparatus.

The coupling and limiting mechanism 70, more specifically the surfaces of the stud 71 and of the slot 72, with interposed spring 75, that represent a pair of mechanical abutments, limit unwanted movements of the reference device 10 away from the grinding wheel 1, for instance the above-mentioned bounces that can occur when the V-shaped reference device 10 hits the orbitally moving pin 15.

Figure 11:
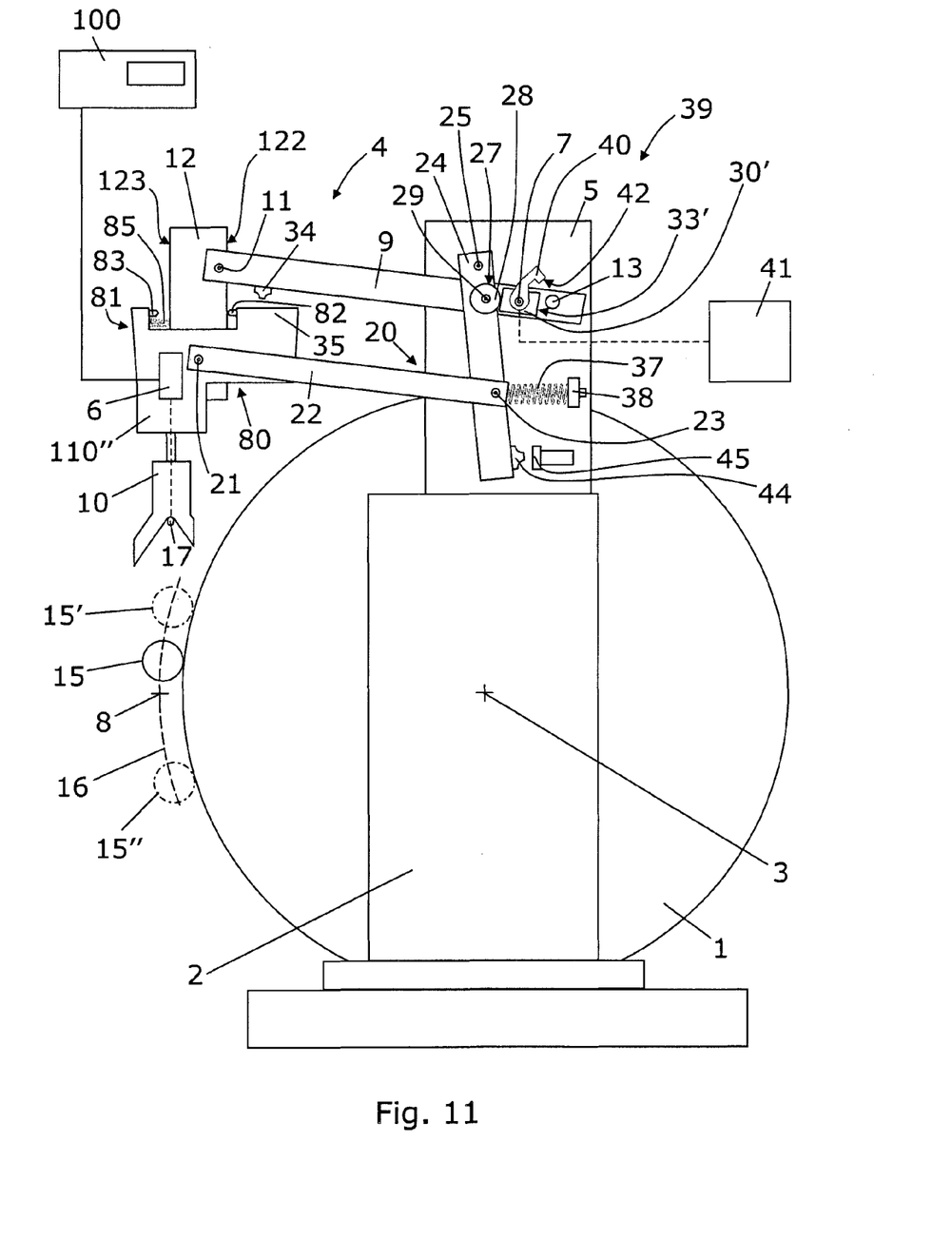
FIG. 11 is a very schematic lateral view that shows some components of a checking apparatus according to a third preferred embodiment of the present invention mounted on the grinding-wheel slide of a grinding machine for crankshafts.

The second preferred embodiment can involve alternative constructions as regards, for instance, the coupling and limiting mechanism 70 that may feature the stud 71 fixed to the second coupling element 12, and not to the third coupling element 22, and the slot 72 formed in the third coupling element, and not in the second coupling element 12. FIG. 11 shows a third preferred embodiment of the present invention wherein, differently from the preceding embodiments, a supporting arm 110" that carries the reference device 10 is rotatably connected to the second coupling element 12 and to the third coupling element 22, so that it can rotate with respect to both the latter about the third axis of rotation 21. A different coupling and limiting mechanism 80 comprises a fork element 81 that, in the schematic illustration of FIG. 11, is shown substantially integral with the supporting arm 110", but that could be alternatively realized as a separate element, rigidly connected to the supporting arm 110". The fork element 81 includes two stops 82 and 83 facing each other and intended to touch mutually opposed surfaces 122, 123 of the second coupling element 12 to define and limit the extent of the limited angular movements. The coupling and limiting mechanism 80 also comprises a thrust device or spring 85. The spring 85 urges one of said stops, the stop 82 in the instance of FIG. 11, against a surface of the second coupling element 12, the surface 122 in the instance of FIG. 11.

The operation of the apparatus of FIG. 11 is substantially the same as described with reference to FIG. 1-9, as far as the guiding condition wherein the V-shaped reference device 10 is guided by the parallelogram structure towards the checking condition is concerned. Before the V-shaped reference device 10 touches the pin 15 to be checked, the position of the supporting arm 110" (and, as a result, of the reference device 10) with respect to the second coupling element 12 (and, as a result, to the parallelogram structure) is steadily defined by the spring 85. When the V-shaped reference device 10 touches the pin 15 to be checked, the thrust that the reference device 10 receives from the pin 15 overcomes that of the spring 85 and allows limited angular movements of the supporting arm 110" and of the reference device 10 it carries, with respect to the parallelogram structure about the oscillation axis that, in this case, is coincident with the third axis of rotation 21. As in the instance of the FIGS. 1-9, during the checking phase the proper cooperation between reference device 10 and pin 15 is kept mainly because of the movements of the coupling element 9 and the coupling element 12 due to the gravity and the thrust of the crankpin 15, in opposition to the gravity of the components of the checking apparatus.

The coupling and limiting mechanism 80, more specifically the stops 82 and 83 and the mutually opposed surfaces 122 and 123 of the second coupling element 12, that define the pairs of mechanical abutments, limit unwanted movements of the reference device 10 with respect to the parallelogram structure, towards and away with respect to the grinding wheel 1, for example the above-mentioned bounces that may occur when the V-shaped reference device 10 hits the orbitally moving pin 15.

Embodiments of the present invention similar to the one shown in FIG. 11 may show differences with respect to what is shown, for instance, as far as the definition of the oscillation axis, that could be in a position different from that of the third axis of rotation 21 or the other axis of rotation of the figure, and/or the shape and arrangement of the fork element 81 are concerned. Feasible differences with respect to the fork element 81, in addition to the one already mentioned in advance (realized as integral with the supporting arm 110", or separate element stiffly fixed to the supporting arm 110"), can involve the stops 82 and 83 arranged at the sides of the third coupling element 22, instead of the second coupling element 12, intended to touch mutually opposed surfaces of said third coupling element 22, instead of the second coupling element 12.

Moreover, FIGS. 10 and 11 schematically show an abutment element 30', connected to the support element 5, different to the cam 30, and accordingly a stop surface 33' that can be, for instance, plane. In these embodiments, too, the constraining linkage 20 and the support device 4 realize a parallelogram structure when, in a guiding condition, the bearing surface 27 of the fourth coupling element 24 touches the stop surface 33' of the abutment element 30', so binding the V-shaped reference device 10 to run, under the effect of the gravity, a circular trajectory defined by such a parallelogram structure, more specifically a trajectory that is parallel and at a reduced distance from to the profile of the grinding wheel 1.

Figure 12:
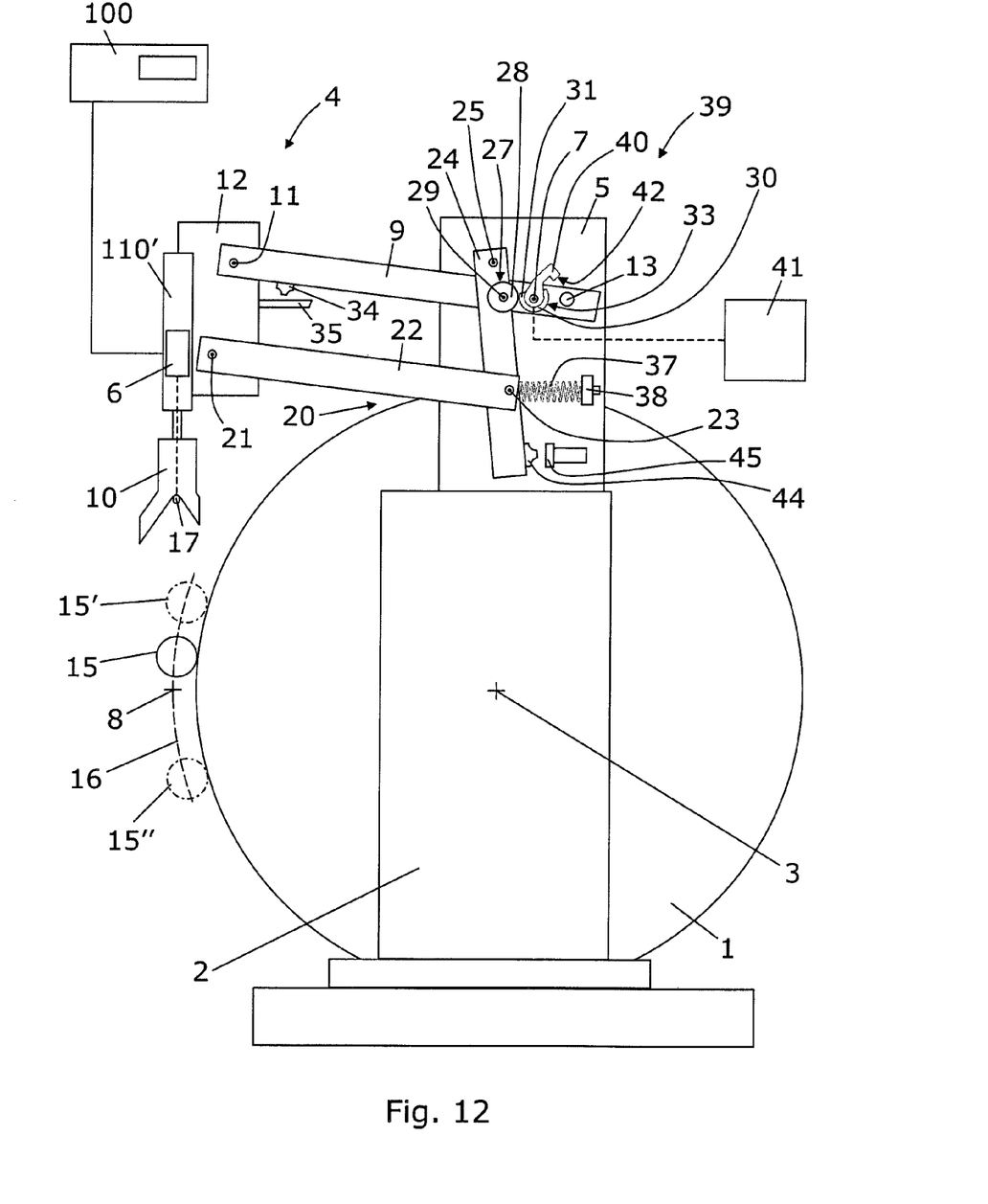
FIG. 12 is a very schematic lateral view that shows some components of a checking apparatus according to a fourth preferred embodiment of the present invention mounted on the grinding-wheel slide of a grinding machine for crankshafts.

FIG. 12 shows a fourth preferred embodiment of the present invention wherein, differently from the previous embodiments, no coupling and limiting mechanism is provided for. As in the second preferred embodiment, the supporting arm 110' is fixed to the second coupling element 12.

The operation of the apparatus of FIG. 12 is substantially the same as described with reference to FIGS. 1-9, as regards both the guiding condition, wherein the V-shaped reference device 10 is guided for a segment by the parallelogram structure, and the checking condition, wherein the proper cooperation between reference device 10 and pin 15 is kept mainly because of the movements of the coupling element 9 and the coupling element 12 due to the gravity and the thrust of the crankpin 15, in opposition to the gravity of the components of the checking apparatus. Therefore, the apparatus of FIG. 12 has the same main advantages of an apparatus according to one of the above described embodiments, being more simple and adapted to the checking of crankpins rotating at lower speeds, where the involved stresses and the thrusts due to the impact between the V-shaped reference device 10 and the orbitally moving pin 15 are lower.

Checking apparatuses according to the present invention can show other constructional differences as regards, for instance, the shape, the dimensions and the position of the different components.

For instance, the abutment element 30, while keeping the above-described functions and features, can be arranged in a different position from that integral with the thrust element 40.

According to an alternative embodiment, the thrust element of the control device 39 can be realized in a different way, per se known, for example with a double acting hydraulic cylinder, and act on different surfaces of the support device 4.

An apparatus according to the invention, thought particularly adapted to the in-process checking of orbitally moving crankpins, can obviously be used for performing dimensional or shape checking of orbitally rotating pins, already machined or to be machined, as well as checking (before, in the course of, or after the machining) of pins rotating about their own axes.

The invention claimed is:

1. An apparatus for checking diametral dimensions of a pin, rotating about a geometrical axis, in the course of the machining in a numerical control grinding machine having a grinding-wheel slide carrying a grinding-wheel, the apparatus comprising:
   a reference device adapted to cooperate with the pin to be checked,
   a measuring device, movable with the reference device,
   a support device for supporting the reference device and the measuring device, the support device comprising:
      a support element adapted to be fixed to the grinding-wheel slide,
      a first coupling element coupled to the support element so as to rotate about a first axis of rotation parallel to said geometrical axis, and
      a second coupling element carrying the reference device and coupled to the first coupling element so as to rotate with respect to it about a second axis of rotation parallel to said geometrical axis,
   a guiding mechanism associated with the support device for guiding the arrangement of the reference device onto the pin, towards a checking condition of the apparatus, and
   a control device for controlling automatic displacements of the apparatus from a rest position to the checking condition, and vice versa,
   wherein the guiding mechanism comprises a constraining linkage between the grinding-wheel slide and the second coupling element, with
   a third coupling element coupled to the second coupling element so as to rotate about a third axis of rotation parallel to said geometrical axis and spaced apart from the second axis of rotation,
   a fourth coupling element coupled to the support element so as to rotate about a fourth axis of rotation parallel to said geometrical axis and spaced apart from the first axis of rotation,
   the third coupling element and the fourth coupling element being connected to each other so as to mutually rotate about a fifth axis of rotation parallel to said geometrical axis.

2. The apparatus according to claim 1, wherein the guiding mechanism comprises a stop surface connected to the support element, and a bearing surface, connected to the fourth coupling element, adapted to enter into engagement with said stop surface in a guiding condition, to define a position of said fifth axis of rotation with respect to said first axis of rotation and a mutual arrangement of said first coupling element and third coupling element, substantially parallel to each other.

3. The apparatus according to claim 2, wherein, at the touch between the bearing surface and the stop surface, said first, second, third and fifth axes of rotation locate the vertices of a parallelogram structure.

4. The apparatus according to claim 2, wherein the stop surface is defined by a stop element connected, axially rotatable, to the support element.

5. The apparatus according to claim 4, wherein the stop element has the shape of a substantially cylindrical element with a lateral surface having variable radius that partly defines said stop surface and shows a sector with reduced radius.

6. The apparatus according to claim 2, wherein the constraining linkage includes a roller, connected to the fourth coupling element, adapted to idle about a sixth axis of rotation parallel to said geometrical axis and comprising a surface of rotation that defines said bearing surface, adapted to cooperate with said stop surface.

7. The apparatus according to claim 1, wherein said control device comprises driving means and a thrust element connected to the support element and to the driving means, adapted to rotate about the first axis of rotation and comprising a thrust surface intended to cooperate with the first coupling element to control said automatic displacements of the apparatus from the rest position to the checking condition.

8. The apparatus according to claim 4, wherein said control device comprises driving means and a thrust element connected to the support element and to the driving means, adapted to rotate about the first axis of rotation and including a thrust surface intended to cooperate with the first coupling element to control said automatic displacements of the apparatus from the rest position to the checking condition, the stop element being integral with the thrust element so that the stop surface is centered on the first axis of rotation.

9. The apparatus according to claim 8, wherein the constraining linkage includes a roller, connected to the fourth coupling element, adapted to idle about a sixth axis of rotation parallel to said geometrical axis and comprising a surface of rotation that defines said bearing surface, adapted to cooperate with said stop surface.

10. The apparatus according to claim 1, further comprising a coupling and limiting mechanism adapted to allow limited angular movements of the reference device with respect to the constraining linkage, about an oscillation axis parallel to said geometrical axis.

11. The apparatus according to claim 10, wherein the coupling and limiting mechanism includes
   at least one pair of mechanical abutments adapted to define and limit the extent of said limited angular movements, and
   a thrust device adapted to thrust the mechanical abutments of said at least one pair against each other.

12. The apparatus according to claim 10, comprising a supporting arm adapted to carry the reference device and the measuring device and connected to the second coupling element rotatable about the oscillation axis.

13. The apparatus according to claim 12, wherein the coupling and limiting mechanism comprises two stops facing each other and integral to one of said supporting arm and second coupling element to define and limit the extent of said limited angular movements.

14. The apparatus according to claim 12, wherein said supporting arm is also rotatably connected to the first coupling element, the oscillation axis being coincident with the second axis of rotation.

15. The apparatus according to claim 12, wherein said supporting arm is also rotatably connected to the third coupling element, the oscillation axis being coincident with the third axis of rotation.

16. The apparatus according to claim 13, wherein the coupling and limiting mechanism comprises a fork element, rigidly connected to the supporting arm or integrally defined by the supporting arm, that defines said two stops, the two stops being adapted to contact mutually opposed surfaces of the second coupling element to define the extent of said limited angular movements of the reference device with respect to the second coupling element.

17. The apparatus according to claim 1, for checking a pin orbitally rotating about said geometrical axis.

18. The apparatus according claim 17, wherein the reference device is a V-shaped device having bearing and reference surfaces adapted to engage the surface of the pin.

* * * * *